United States Patent
Hashimoto

(10) Patent No.: US 7,424,774 B2
(45) Date of Patent: Sep. 16, 2008

(54) METHOD OF MANUFACTURING A HEAD ACTUATOR ASSEMBLY AND A DISK DRIVE

(75) Inventor: Yasuichi Hashimoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 299 days.

(21) Appl. No.: 11/145,181

(22) Filed: Jun. 6, 2005

(65) Prior Publication Data

US 2005/0268456 A1 Dec. 8, 2005

(30) Foreign Application Priority Data

Jun. 7, 2004 (JP) ............................. 2004-169092

(51) Int. Cl.
G11B 5/127 (2006.01)
H04R 31/00 (2006.01)
(52) U.S. Cl. .............. 29/603.04; 29/603.03; 29/603.06; 360/234.5; 360/235.8; 360/244.5
(58) Field of Classification Search .............. 29/603.03, 29/603.04, 603.06; 360/234.5, 235.8, 244.5
See application file for complete search history.

(56) References Cited

U.S. PATENT DOCUMENTS

| | | | | |
|---|---|---|---|---|
| 5,103,359 | A | * | 4/1992 | Marazzo .................. 360/264.2 |
| 5,844,754 | A | | 12/1998 | Stefansky et al. |
| 5,862,017 | A | | 1/1999 | Kohira et al. |
| 6,396,665 | B1 | * | 5/2002 | Asano ..................... 360/264.2 |
| 6,459,548 | B1 | | 10/2002 | Shiraishi et al. |
| 6,543,673 | B2 | | 4/2003 | Lennard et al. |
| 2002/0038506 | A1 | | 4/2002 | Kamigama et al. |
| 2003/0142447 | A1 | | 7/2003 | Sakamoto et al. |
| 2004/0012891 | A1 | | 1/2004 | Habe et al. |

FOREIGN PATENT DOCUMENTS

| | | |
|---|---|---|
| CN | 1347080 | 5/2002 |
| CN | 1115693 | 7/2003 |
| JP | 08-212728 | 8/1996 |
| JP | 2955782 | 7/1999 |
| JP | 11-238218 | 8/1999 |
| JP | 11-250434 A | 9/1999 |
| JP | 2002-083477 A | 3/2002 |
| JP | 2002-092835 A | 3/2002 |
| JP | 2002-269714 A | 9/2002 |

OTHER PUBLICATIONS

Notification of Reasons for Rejection dated Nov. 7, 2007.
Chinese Office Action dated Nov. 3, 2006 for Appln. No. 200510076420.9.
Australian Search Report dated Mar. 9, 2006 for Singapore Appln. No. 200503466-5.
Japanese Office Action dated Mar. 4, 2008 for Appln. No. 2004-169092.

* cited by examiner

Primary Examiner—Paul D Kim
(74) Attorney, Agent, or Firm—Pillsbury Winthrop Shaw Pittman, LLP

(57) ABSTRACT

A head actuator assembly of a disk device has a suspension which supports a head, an arm which supports the suspension and is rotatably supported by a bearing portion, signal wires which extend on the suspension and the arm and are connected electrically to the head, and a board unit. In manufacture, the signal wires are mounted on the suspension and the arm, and a connecting end portion of the board unit is connected to the signal wires mounted on the suspension and the arm. Thereafter, the head is mounted on the suspension and connected electrically to the signal wires.

2 Claims, 10 Drawing Sheets

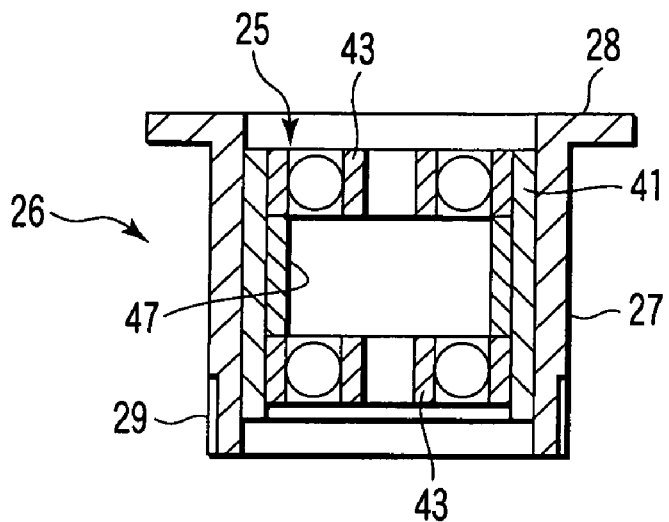
F I G. 4
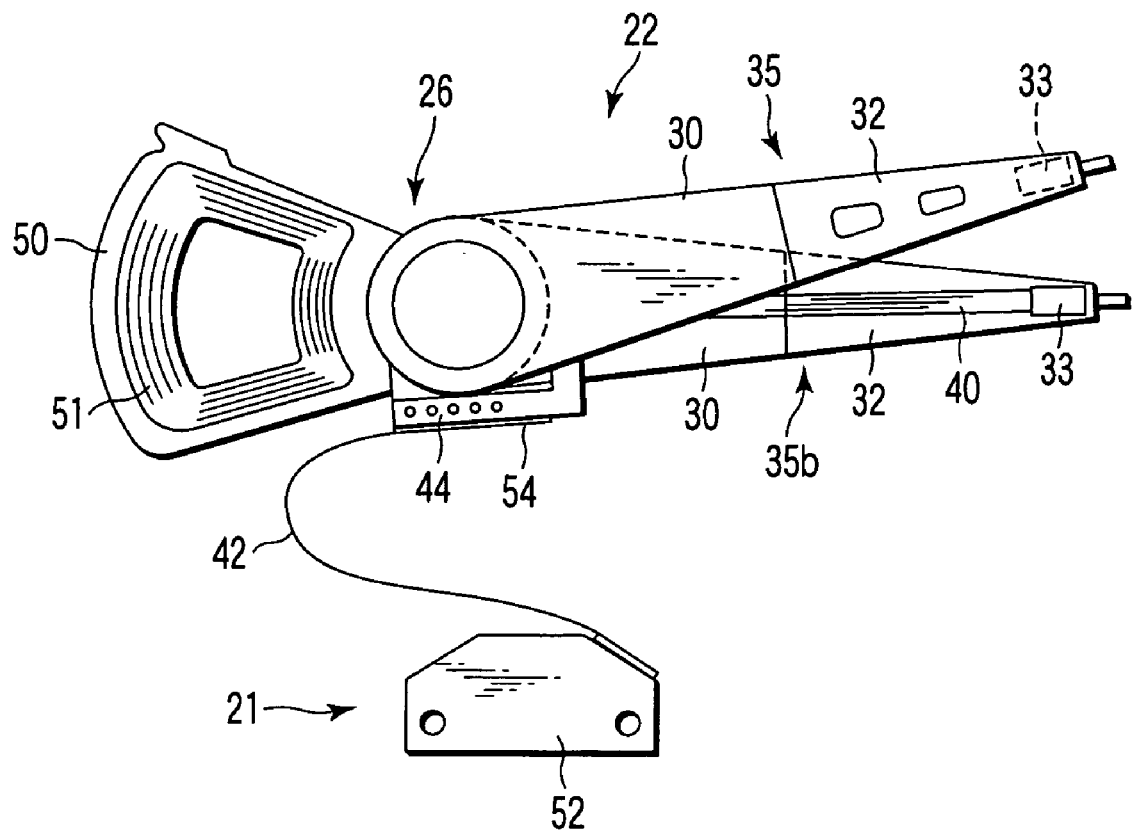
F I G. 5

METHOD OF MANUFACTURING A HEAD ACTUATOR ASSEMBLY AND A DISK DRIVE

CROSS-REFERENCE TO RELATED APPLICATIONS

This application is based upon and claims the benefit of priority from prior Japanese Patent Application No. 2004-169092, filed Jun. 7, 2004, the entire contents of which are incorporated herein by reference.

BACKGROUND OF THE INVENTION

1. Field of the Invention

This invention relates to a method of manufacturing a head actuator assembly used in a disk device and a method of manufacturing the disk device.

2. Description of the Related Art

In recent years, disk devices, such as magnetic disk devices, and optical disk devices, have been widely used as external recording devices of computers and image recording devices. A magnetic disk device as an example of a disk device comprises magnetic disks located in a case, a spindle motor that supports and rotates the disks, magnetic heads for writing and reading information to and from the disks, and a head actuator assembly that supports the heads for movement with respect to the disks.

Usually, the head actuator assembly has a slider formed having a magnetic head, a suspension that supports the slider, and an arm that supports the suspension. A wiring pattern is fixed on the suspension and the arm, the slider is fixed on the wiring pattern, and the magnetic head is connected electrically to the wiring pattern.

The arm of the head actuator assembly is rotatably supported by a bearing assembly. A voice coil that constitutes a voice coil motor is mounted on the other end of the arm. The magnetic head can be moved to any desired position on a magnetic disk by rotating the head actuator assembly by the voice coil motor.

In the magnetic disk device described above, the magnetic head flies at a very low height above a surface of the magnetic disk as it records and reproduces information. Thus, very small foreign matter must be prevented from getting into the device, so that the device must be assembled in a high-performance clean room. Generally, therefore, the head actuator assembly is also assembled in the clean room. Recently prevailing magnetic heads have an ultrathin-film structure, so that their electrostatic resistance is very low, and they are expected to be assembled in an environment that is backed by highly sophisticated measures to counter static electricity.

In general, as is described in Jpn. Pat. Appln. KOKAI Publication No. 2002-269714, for example, a magnetic head is temporarily assembled as a head-gimbals assembly (hereinafter referred to as an HGA), a peculiar component, attached to a suspension, and is subjected to inspection thereafter. In assembly processes, the HGA is attached to an arm that is supported by a bearing assembly, and a voice coil is attached to a mechanical part including an arm. A head actuator assembly is assembled by further connecting the HGA electrically to a flexible board that has a control circuit.

All these assembly processes are performed in a clean room. Also proposed is a configuration such that a suspension and an arm are formed integrally with each other or a head stack is formed by stacking in layers suspensions that are previously fixed to arms, individually.

If the head actuator assembly is assembled entirely in the clean room in this manner, the clean room should be large, and the assembly conditions strict. In assembling a suspension assembly, moreover, signal wires that extend from the magnetic head and overlies the suspension are connected to the flexible circuit board having the control circuit by soldering or the like. Possibly, the magnetic head may undergo dielectric breakdown caused by fine static electricity during connection work or its preceding assembly operations.

BRIEF SUMMARY OF THE INVENTION

According to an aspect of the present invention, there is provided a method of manufacturing a head actuator assembly, which has a head which processes information for a disk-shaped recording medium, a suspension which supports the head, an arm which supports the suspension and is rotatably supported by a bearing portion, signal wires which extend on the suspension and the arm and are connected electrically to the head, a board unit having a connecting end portion connected to the signal wires, and a control section which controls the information processing of the head, the method comprising: mounting the signal wires on the suspension and the arm; connecting the connecting end portion of the board unit to the signal wires mounted on the suspension and the arm; and mounting the head on the suspension and connecting the head electrically to the signal wires which are connected to the connecting end portion of the board unit.

According to another aspect of the present invention, there is provided a method of manufacturing a head actuator assembly, which has a plurality of heads which individually process information for disk-shaped recording media, a plurality of suspensions which support the heads, individually, a plurality of arms which support the suspensions, individually, and are rotatably supported by a bearing portion, signal wires which extend on the suspensions and the arms and are connected electrically to the heads, a control section which controls the information processing of the heads and a board unit having a connecting end portion connected to the signal wires, the method comprising: mounting the signal wires on the suspensions and the arms; connecting the connecting end portion of the board unit to the signal wires mounted on the suspensions and the arms; and mounting the heads on the suspensions and connecting the heads electrically to the signal wires which are connected to the connecting end portion of the board unit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a sectional view showing a bearing assembly of the head actuator assembly;

FIG. 5 is a plan view showing a manufacturing process for the head actuator assembly;

DETAILED DESCRIPTION OF THE INVENTION

A method of manufacturing a head actuator assembly according to a first embodiment of this invention will now be described in detail with reference to the accompanying drawings. First, an HDD will be described as a disk device that is provided with the head actuator assembly.

Figure 1:
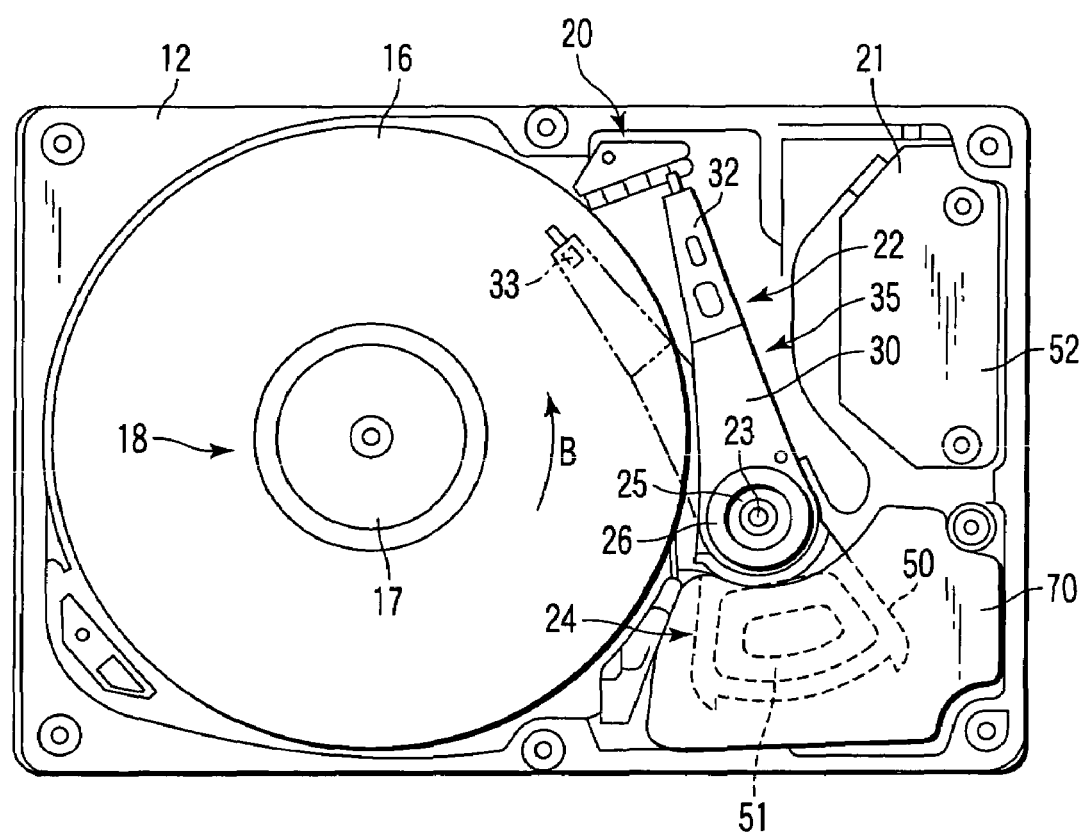
FIG. 1 is a plan view showing the interior of a hard disk drive (hereinafter referred to as an HDD) according to a first embodiment of the invention.

As shown in FIG. 1, the HDD comprises a case 12 in the form of an open-topped rectangular box and a top cover (not shown). The top cover is screwed to the case with screws and closes a top opening of the case 12.

The case 12 contains a magnetic disk 16 for use as a recording medium, a spindle motor 18, a magnetic head 33, a carriage assembly 22. The spindle motor 18 serves as a drive unit that supports and rotates the disk 16. The magnetic head 33 is used to write and read information to and from the disk 16. The carriage assembly 22 supports the magnetic head 33 for movement with respect to the magnetic disk 16. The case 12 further contains a voice coil motor (hereinafter referred to as a VCM) 24, a ramp load mechanism 20, a flexible printed circuit board unit (hereinafter referred to as an FPC unit) 21, etc. The VCM 24 rotates and positions the carriage assembly 22. The ramp load mechanism 20 holds the magnetic head 33 in a retreated position off the magnetic disk 16 when the head 33 is moved to the outermost periphery of the disk. The FPC unit 21 is mounted with a read-write amplifier for use as a control circuit for recording and reproducing signals, for example. A printed circuit board (not shown) for controlling the respective operations of the spindle motor 18, VCM 24, and magnetic heads through the FPC unit 21 is screwed to the outer surface of a bottom wall of the case 12. The carriage assembly 22 and the FPC unit 21 constitute the head actuator assembly.

The magnetic disk 16 has a magnetic recording layer on its surface. The disk 16 is fitted on the outer periphery of a hub (not shown) of the spindle motor 18 and fixedly supported on the hub by a clamp spring 17. As the motor 18 is driven, the disk 16 is rotated at a given speed of, e.g., 4,200 rpm, in the direction of arrow B.

As shown in FIGS. 1 to 4, the carriage assembly 22 comprises a bearing assembly 26 fixed to the bottom wall of the case 12, two head gimbals assemblies (hereinafter referred to as HGA's) 35 and 35b supported on the bearing assembly, and a spacer ring 34. The bearing assembly 26, which serves as a bearing portion, is provided with a cylindrical sleeve 27 and a bearing unit 25 fitted coaxially in the sleeve. The bearing unit 25 is fitted on a pivot 23 that is set up on the bottom wall of the case 12. Thus, the sleeve 27 is rotatably supported on the pivot 23 by the bearing unit 25.

An annular flange 28 is formed on the upper end of the sleeve 27, and a thread portion 29 is formed on the outer periphery of the lower end portion of the sleeve. As shown in FIG. 4, the bearing unit 25 has a retaining cylinder 41, a pair of bearings 43, and a spacer ring 47. The bearings 43 are fitted in the retaining cylinder and opposed to each other with a given gap between them. The spacer ring 47 is located between the paired bearings in the retaining cylinder.

Figure 2:
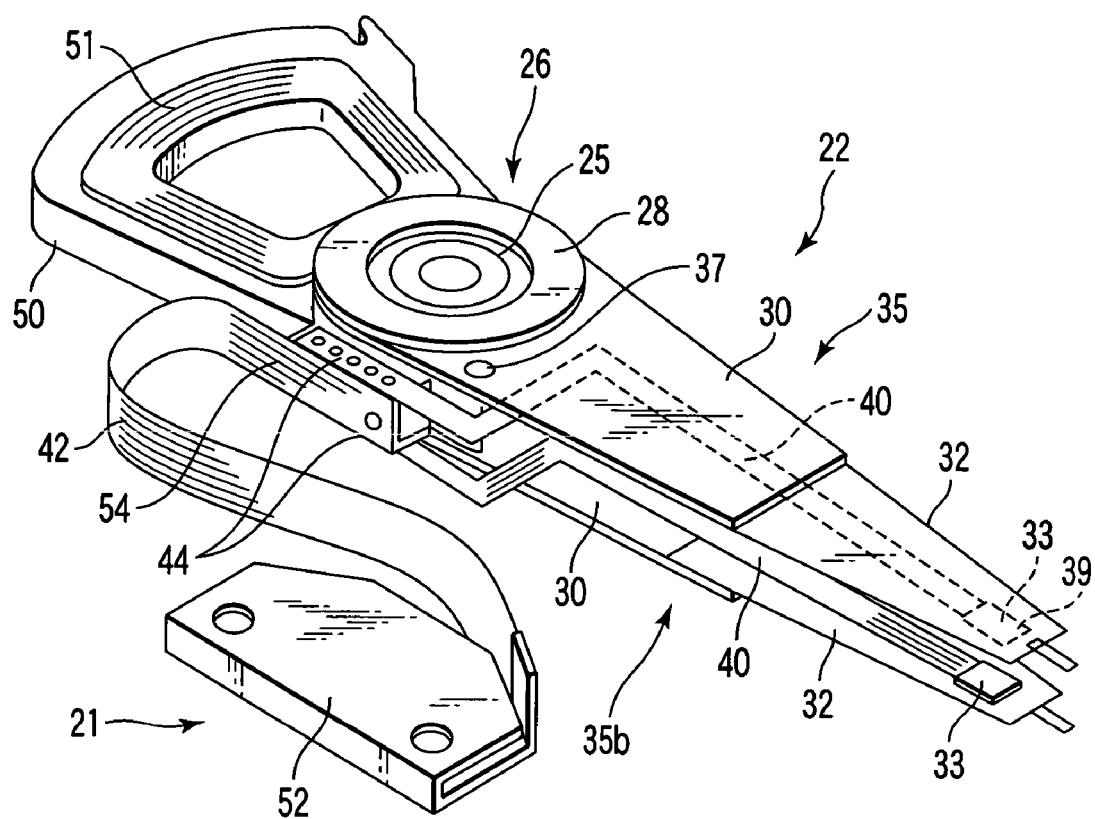
FIG. 2 is a perspective view showing a head actuator assembly of the HDD.
Figure 3:
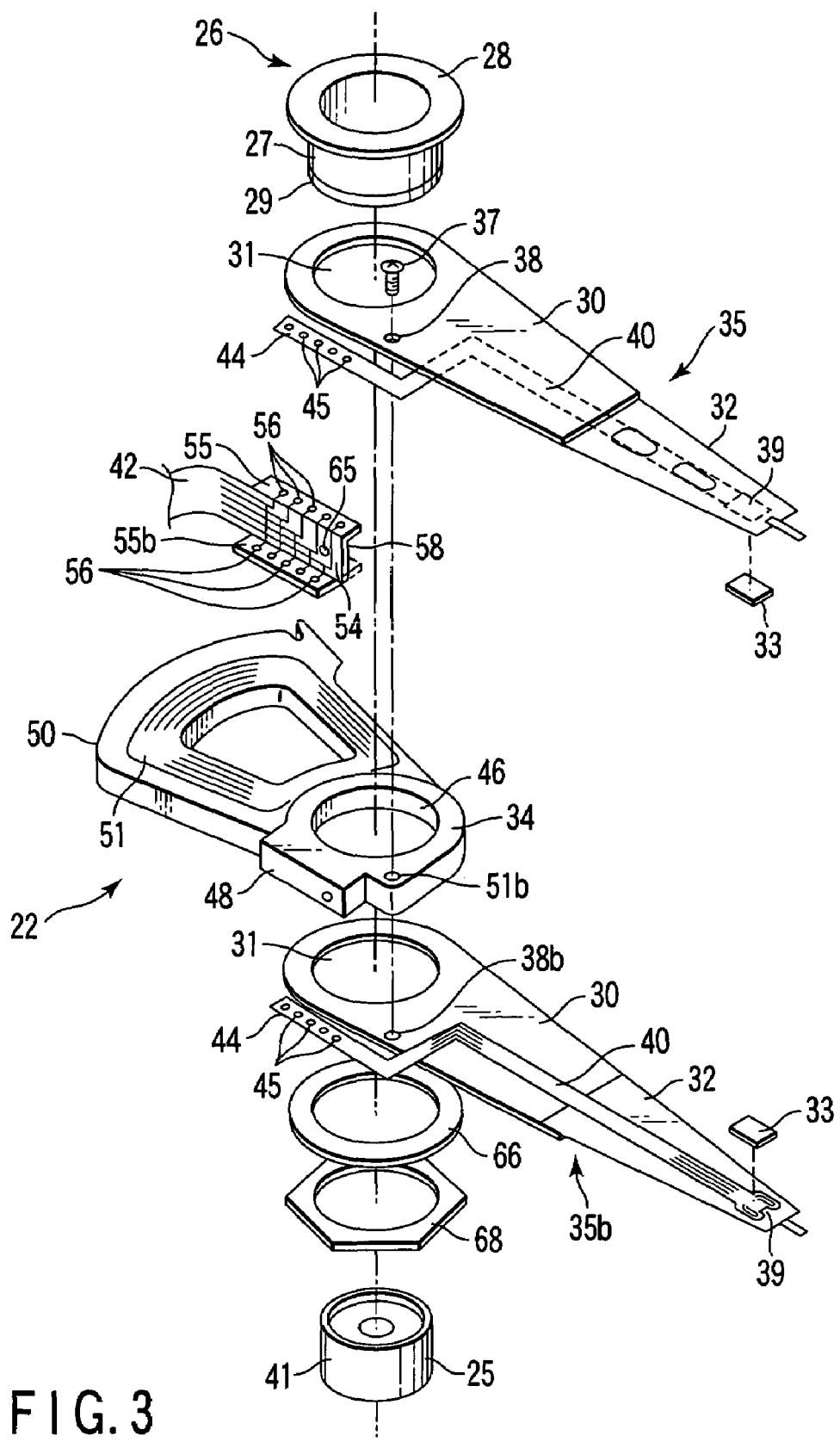
FIG. 3 is an exploded perspective view showing the head actuator assembly.

As shown in FIGS. 2 and 3, the HGA 35 comprises an arm 30 attached to the sleeve 27, a suspension 32 extending from the arm, and a magnetic head 33 that is supported on an extended end of the suspension by a gimbals portion 39. The arm 30 is a thin flat plate of a stainless-steel, such as SUS304, with a thickness of about 200 μm. A circular through hole 31 is formed in one end or proximal end portion of the arm 30. The proximal end portion of the arm 30 is formed having a positioning hole 38 through which a positioning screw 37 is passed.

The suspension 32 is formed of an elongated leaf spring with a thickness of 20 to 100 μm. The proximal end of the suspension 32 is fixed to the distal end of the arm 30 by spot welding or adhesive bonding and extends from the arm. The suspension 32 and the arm 30 may be molded integrally from the same material.

The magnetic head 33 has a substantially rectangular slider and a recording/reproducing magnetic resistance (MR) head formed on the slider, and is fixed to the gimbals portion 39 on the distal end portion of the suspension 32. The head 33 has electrodes (not shown).

As shown in FIGS. 2 and 3, the magnetic head 33 is connected electrically to a main FPC 42 (mentioned later) through a relay flexible printed circuit board (hereinafter referred to as a relay FPC) 40 that has signal wires. The relay FPC 40 is stuck on the respective inner surfaces of the arm 30 and the suspension 32 and extends from the distal end of the suspension to the proximal end portion of the arm. The relay FPC 40 is in the form of an elongated belt as a whole, and its distal end is connected electrically to the electrodes of the magnetic head 33 by bonding or soldering. The other end portion of the relay FPC 40 is cranked and extends outward from the proximal end portion of the arm 30. The other end portion of the relay FPC 40 constitutes a junction 44. The junction 44 is formed having a plurality of connector pads 45, which are spaced in its longitudinal direction. The junction 44 extends parallel to the inner surface of the arm 30. The pads 45 are provided on that surface of the junction 44 which is opposite to the arm 30.

The HGA 35b has the same configuration as the HGA 35, and these two are symmetrical with respect to each other. More specifically, the HGA 35b comprises an arm 30 attached to the sleeve 27 of the bearing assembly 26, a suspension 32 extending from the arm, and a magnetic head 33 that is supported on an extended end of the suspension by a gimbals portion 39. The arm 30 has a circular through hole 31 in its proximal end portion, and a tapped hole 38b formed near the through hole 31. A relay FPC 40 is stuck on the respective inner surfaces of the arm 30 and the suspension 32 and extends from the distal end of the suspension to the proximal end portion of the arm. The distal end of the relay FPC 40 is connected electrically to the magnetic head 33. The other end portion of the relay FPC 40 is cranked and extends outward from the proximal end portion of the arm 30. The other end portion of the relay FPC 40 constitutes a junction 44. The junction 44 is formed having a plurality of connector pads 45, which are spaced in its longitudinal direction.

The spacer ring 34 that serves as a spacer member has a through hole 46 through which the sleeve 27 is passed, a projection 48 that projects sideways, and a support frame 50 that extends in a direction opposite to the arm 30. The ring 34 is molded integrally from a synthetic resin or the like. A voice coil 51 that constitutes a part of the VCM 24 is embedded in the support frame 50. The spacer ring 34 has a positioning hole 51b that is formed in a position corresponding to the positioning hole 38 of the arm 30.

As shown in FIGS. 1 to 3, the FPC unit 21 has a base portion 52 and the main flexible printed circuit board (main FPC) 42. The base portion 52 is formed by bending a flexible printed circuit board into a substantially rectangular shape. The main FPC 42 is an elongated belt that extends from the base portion 52. These elements are formed integrally of a common flexible printed circuit board. The base portion 52 is mounted with a plurality of electronic components, such as a head amplifier, connector, etc., which control information processing of the magnetic head 33. The base portion 52 is fixed on the bottom wall of the case 12.

An extended end portion of the main FPC 42 that extends from the base portion 52 constitutes a connecting end portion 54.

The connecting end portion 54 is provided integrally with a rectangular junction 55 that projects upward and a rectangular junction 55b that projects downward. A plurality of connector pads 56 are provided on the respective surfaces of the junctions 55 and 55b and arranged at spaces in the longitudinal direction of the junctions. These connector pads 56 correspond to the connector pads 45 of the relay FPC 40 in number and location. The connector pads 56 are connected electrically to the base portion 52 through a conductor pattern of the main FPC 42.

A metallic reinforcing plate 58 is stuck on the reverse side of the connecting end portion 54 including the junctions 55 and 55b. The junctions 55 and 55b are bent at right angles to the connecting end portion 54 and face each other. The connecting end portion 54 and the reinforcing plate 58 are formed having a through hole 65 through which a fixing screw is passed. A jig may be used to settle positions in the transverse and circumferential directions without using the positioning screw.

The HGA's 35 and 35b and the spacer ring 34 are mounted in layers on the sleeve 27 of the bearing assembly 26. The arm 30 of the HGA 35 is fitted on the sleeve 27 in a manner such that it is stacked on the flange 28 in the axial direction of the sleeve 27 with the sleeve passed through the through hole 31. The arm 30 of the other HGA 35b is fitted on the sleeve 27 in a manner such that it is stacked on the spacer ring 34 with the sleeve 27 passed through the through hole 31.

The two arms 30 and the spacer ring 34 that are fitted on the sleeve 27 are sandwiched between the flange 28 and a combination of a washer 66 and a nut 68 and are fixedly held on the sleeve 27. The washer 66 is fitted on the lower end portion of the sleeve 27, while the nut 68 is screwed on the thread portion 29 of the sleeve 27. The positioning screw 37 is passed from above through the positioning hole 38 in the arm 30 of the HGA 35 and the positioning hole 51b in the spacer ring 34, and screwed into the tapped hole 38b in the arm 30 of the HGA 35b. Thus, the one arm 30, the spacer ring 34, and the other arm 30 are located in given relative positions with respect to the circumferential direction of the sleeve 27. The two arms 30 extend in the same direction from the sleeve 27 and are rockable together with the sleeve 27. The respective magnetic heads 33 of the HGA's 35 and 35b are situated opposite each other.

The connecting end portion 54 of the main FPC 42 is fixed to the projection 48 of the spacer ring 34 with screws. The junction 44 of the relay FPC 40 that extends from the one arm 30 is overlapped on the one junction 55 of the main FPC 42. The connector pads 45 of the junction 44 are soldered and connected mechanically and electrically to the connector pads 56 of the junction 55. Likewise, the junction 44 of the relay FPC 40 that extends from the other arm 30 is overlapped on the other junction 55b of the main FPC 42. The connector pads 45 of the junction 44 are soldered and connected mechanically and electrically to the connector pads 56 of the junction 55b. Thus, the magnetic heads 33 are connected electrically to the FPC unit 21 through the relay FPC 40 and the main FPC 42, whereupon the head actuator assembly is completed.

As is evident from FIG. 1, the head actuator assembly constructed in this manner is located in the case of the HDD, and the bearing assembly 26 is mounted on the bottom wall of the case 12 by the pivot 23. The base portion 52 of the FPC unit 21 is fixed on the bottom wall of the case 12 with screws. The voice coil 51 that is fixed to the support frame 50 is situated between a pair of yokes 70 that are fixed on the case 12. The voice coil 51, along with these yokes and a magnet (not shown) fixed to one of the yokes, constitute the VCM 24.

If the voice coil 51 is energized to actuate the HDD, the HGA's 35 and 35b rock, whereupon the magnetic heads 33 are moved and positioned on a desired track of the magnetic disk 16. The respective magnetic heads 33 of the HGA's 35 and 35b are situated opposite each other with the magnetic disk 16 between them and moved individually on the opposite surfaces of the disk. The magnetic disk 16 used in this case has magnetic recording layers on its opposite sides, individually.

The head actuator assembly of this construction is manufactured in the following processes. First, the suspensions 32 are fixed to the arms 30, as shown in FIG. 3, and the relay FPC's 40 are then stuck on the arms and the suspensions. The arms 30 and the suspensions 32 are formed in two sets. On the other hand, the spacer ring 34, which is fitted with the voice coil 51, and the FPC unit 21 are prepared in advance.

Subsequently, the one arm 30, the spacer ring 34, and the other arm 30 are attached in succession to the sleeve 27 of the bearing assembly 26, and the nut 68 is temporarily tightened with the aid of the washer 66 to form a stack assembly. Thereafter, the connecting end portion 54 of the main FPC 42 is screwed to the projection 48 of the spacer ring 34, and the connector pads 45 of the paired relay FPC's 40 are soldered individually to their corresponding connector pads 56 on the connecting end portion 54. Thus, the relay FPC's 40 and the FPC unit 21 are connected electrically and mechanically to one another.

As shown in FIG. 5, thereafter, at least one of the two arms 30 on the sleeve 27 is rocked around the sleeve 27, whereupon the two arms are positioned and tacked in a manner such that they are staggered by a margin larger than the width of each magnetic head 33 in their rocking direction. The two arms 30 may be mounted on the sleeve 27 so as to establish the aforesaid positional relations in advance.

Then, the carriage assembly 22 and the FPC unit 21, which are temporarily assembled, are cleaned temporarily. The foregoing manufacturing processes are performed in the atmosphere, for example. The temporary cleaning may be omitted.

After the temporary cleaning, the carriage assembly 22 and the FPC unit 21 are carried into a clean room, and these elements, including the sleeve 27, are subjected to advanced cleaning in the clean room. After the magnetic heads 33 are then bonded onto the gimbals portions 39 of the suspensions 32, their electrodes are soldered and connected electrically to the pads (not shown) of the relay FPC's 40. In doing this, the two arms 30 are staggered, and the respective distal end portions of the suspensions 32 that are to be mounted with the magnetic heads are also staggered. Therefore, the magnetic heads 33 can be easily mounted and connected without any interference between the two suspensions 32. After the heads 33 are connected, the two arms 30 are aligned in opposite positions, and the nut 68 is regularly tightened to fix the arms to the sleeve 27.

After the magnetic heads 33 are mounted in this manner, the carriage assembly 22 and the FPC unit 21 are subjected again to advanced cleaning to be cleared of dust. Ultrasonic cleaning using, for example, water as a medium is employed as the advanced cleaning. Finally, the bearing unit 25 is forced into the sleeve 27 to form the bearing assembly 26 in the clean room. When these processes are carried out, the head actuator assembly is completed. The manufactured head actuator assembly is located in a predetermined position in the case 12.

According to the method of manufacturing the head actuator assembly in this manner and the method of manufacturing the disk device, the magnetic heads 33 are mounted on the suspensions and connected electrically to the relay FPC's 40 after the relay FPC's 40 are connected electrically to the FPC unit 21. Conventionally, at least two cycles of connecting operations are performed, including operation for mounting the magnetic heads on the suspensions and operation for connecting the signal wires, which extends through the suspension and arm, to the FPC unit 21 thereafter. According to the present embodiment, however, the connecting operation that involves a high possibility of applying static electricity to signal terminal areas of the magnetic heads can be restricted to one cycle for magnetic head mounting. Thus, the magnetic heads can be securely prevented from being damaged by static electricity, and the yield of manufacture can be improved.

Further, other component members can be assembled with the magnetic heads 33 off and thoroughly cleaned thereafter. Thus, the complicated assembly that requires high accuracy can be carried out outside the clean room, so that the manufacturing efficiency can be improved, and the assembly conditions can be eased. Since no magnetic head is present during all other assembly operations than the magnetic head mounting, consideration for static electricity can be greatly lessened, and the manufacturing efficiency can be improved.

According to the first embodiment, furthermore, a plurality of arms are staggered in their rocking direction and tacked, and the magnetic heads are mounted and connected in this state. Thus, the magnetic heads can be efficiently mounted and connected without interfering with the other suspension or the like.

The following is a description of an HDD according to a second embodiment of this invention. Like reference numerals are used to designate like portions of the first and second embodiments, and a detailed description of those portions is omitted.

Figure 6:
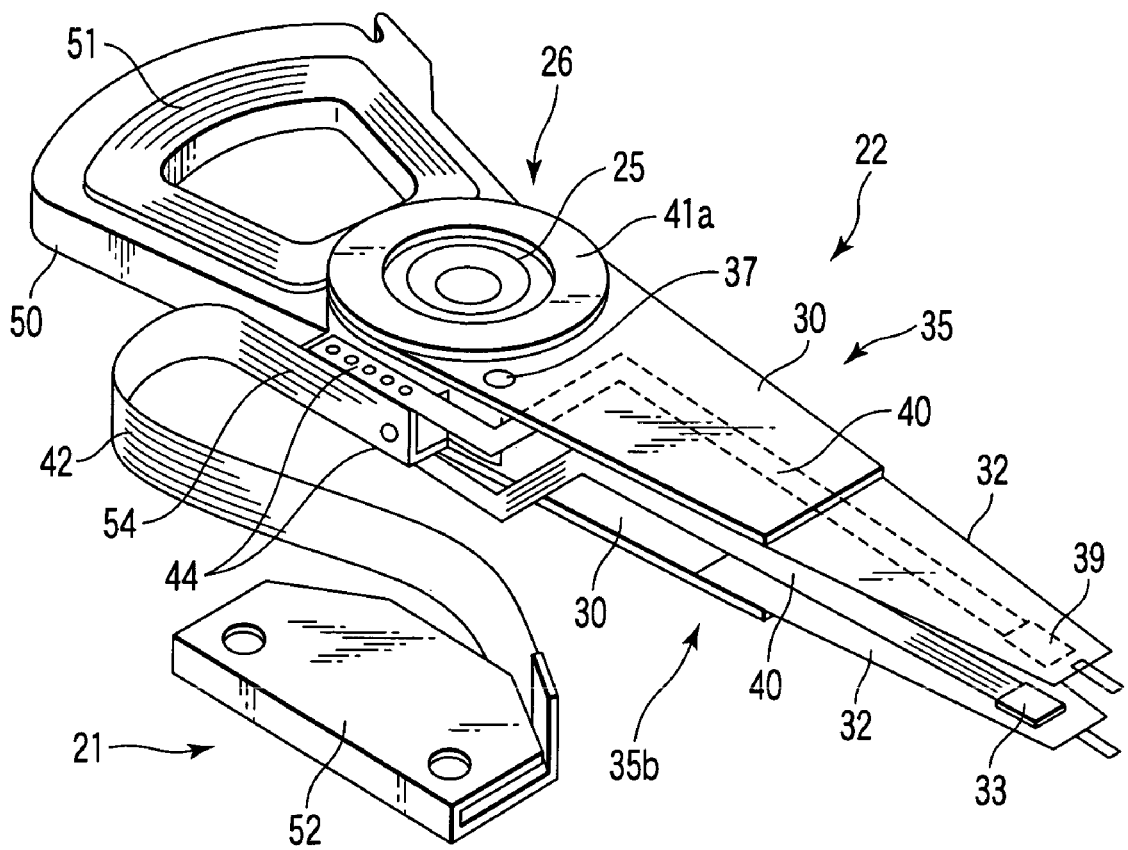
FIG. 6 is a perspective view showing a head actuator assembly according to a second embodiment of the invention.
Figure 7:
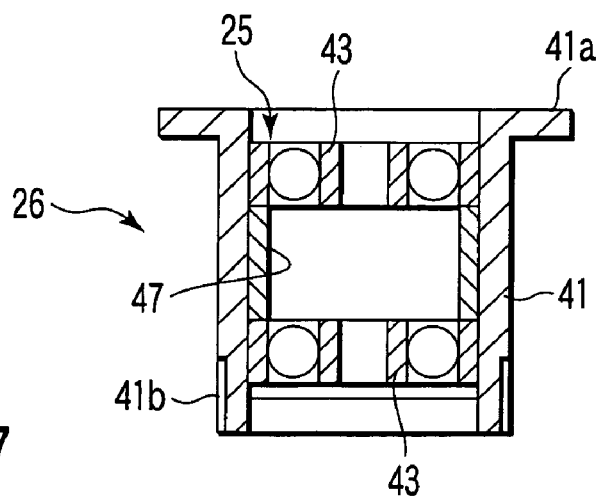
FIG. 7 is a sectional view showing a bearing assembly of the head actuator assembly of the second embodiment.
Figure 8:
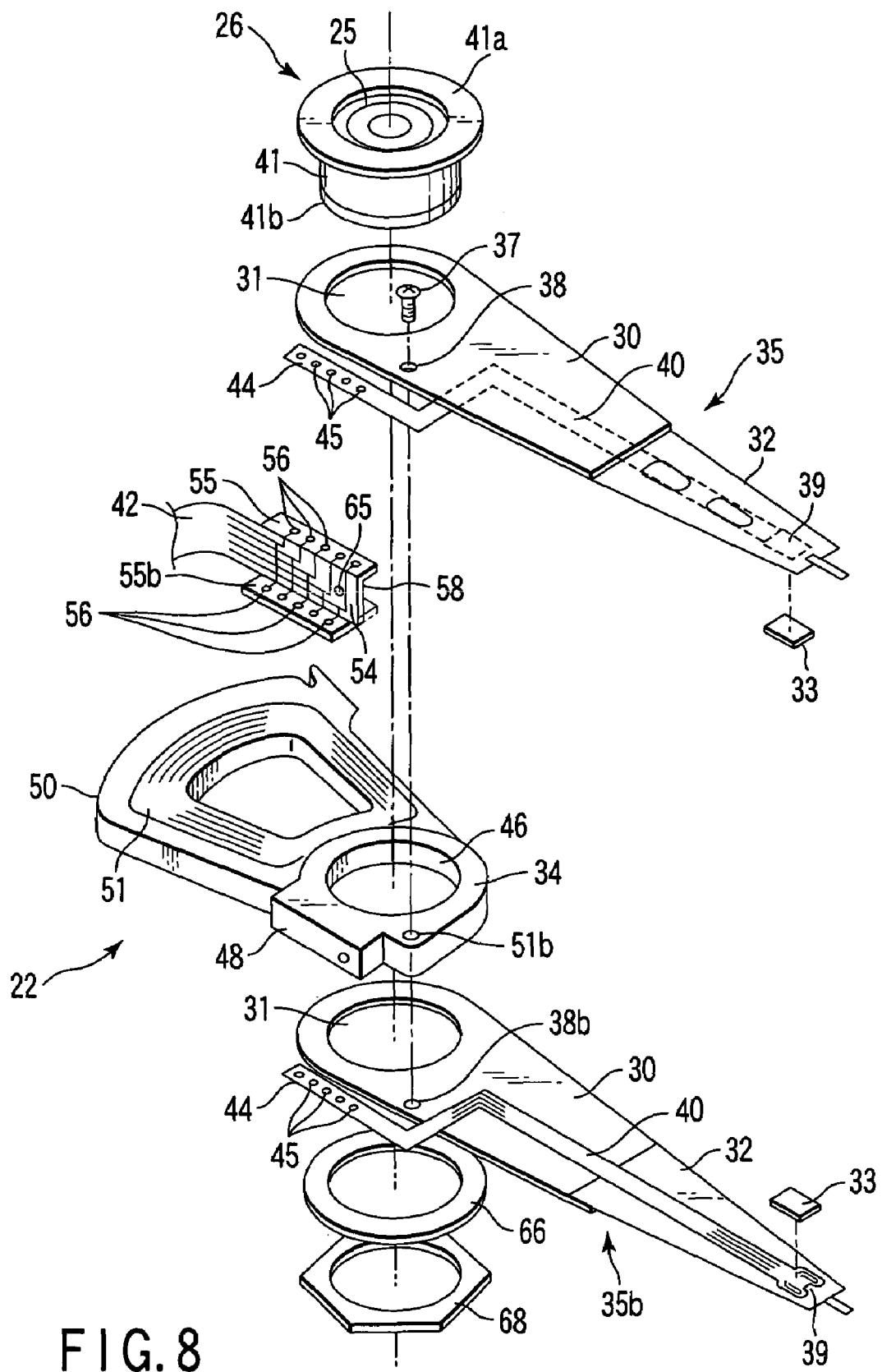
FIG. 8 is an exploded perspective view showing the head actuator assembly of the second embodiment.

According to the second embodiment, as shown in FIGS. 6 to 8, a bearing portion of a head actuator assembly includes a bearing unit 25 alone without including a sleeve. The bearing unit 25 has a retaining cylinder 41, a pair of bearings 43, and a spacer ring 47. The bearings 43 are fitted in the retaining cylinder and opposed to each other with a given gap between them. The spacer ring 47 is located between the paired bearings in the retaining cylinder. An outwardly extending annular flange 41a is formed integrally on the upper end of the retaining cylinder 41. A thread portion 41b is formed on the outer periphery of the lower end portion of the retaining cylinder 41. The bearing unit 25 is attached to two arms 30 with the retaining cylinder 41 directly fitted in through holes 31 that are formed individually in the respective proximal end portions of the arms 30.

In manufacturing the head actuator assembly of this construction, suspensions 32 are first fixed to the arms 30, as shown in FIG. 8, and relay FPC's 40 are then stuck on the arms and the suspensions. The arms 30 and the suspensions 32 are formed in two sets. On the other hand, a spacer ring 34, which is fitted with a voice coil 51, and an FPC unit 21 are prepared in advance. The arms 30, the suspensions 32, a support frame 50, the voice coil 51, and the FPC unit 21 are subjected to ultrasonic cleaning using, for example, water as a medium. The foregoing manufacturing processes are performed in the atmosphere.

After the cleaning, the assembly and the FPC unit 21 are carried into a clean room, and the one arm 30, the spacer ring 34, and the other arm 30 are attached in succession to the retaining cylinder 41 of the bearing unit 25 in the clean room. Thereafter, a nut 68 is temporarily tightened with the aid of a washer 66 to form a stack assembly.

Subsequently, a connecting end portion 54 of a main FPC 42 is screwed to a projection 48 on the spacer ring 34, and connector pads 45 of the paired relay FPC's 40 are soldered individually to their corresponding connector pads 56 on the connecting end portion 54. Thus, the relay FPC's 40 and the FPC unit 21 are connected electrically and mechanically to one another.

Figure 9:
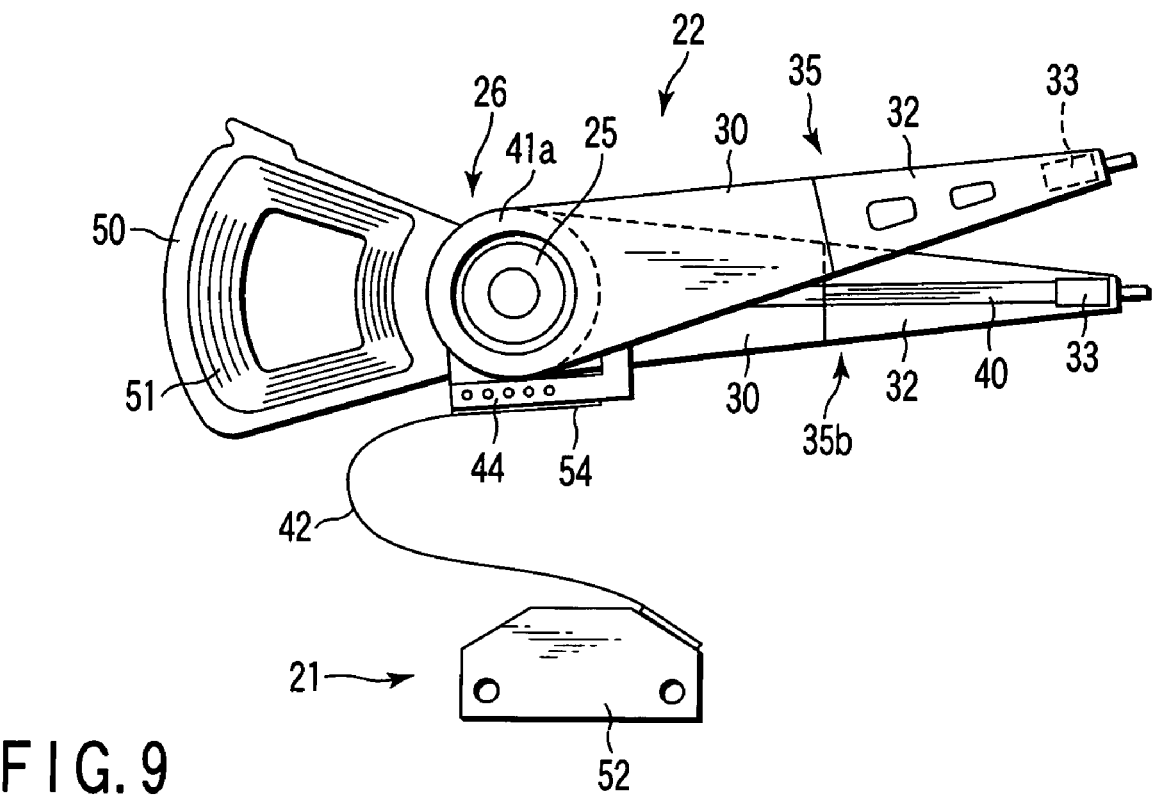
FIG. 9 is a plan view showing a manufacturing process for the head actuator assembly of the second embodiment.
Figure 10:
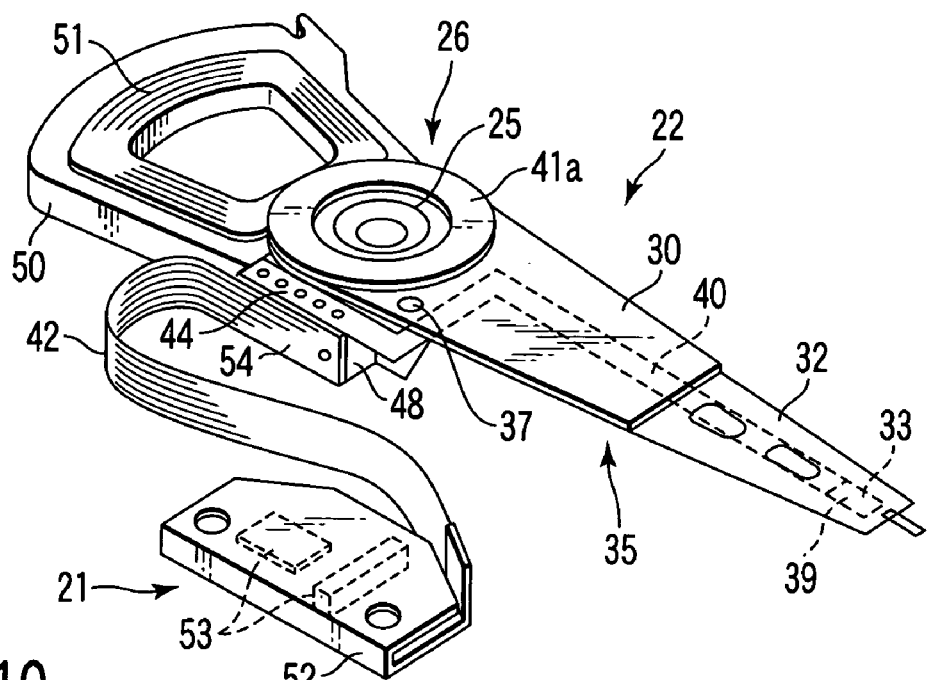
FIG. 10 is a perspective view showing a head actuator assembly according to a third embodiment of the invention.
Figure 11:
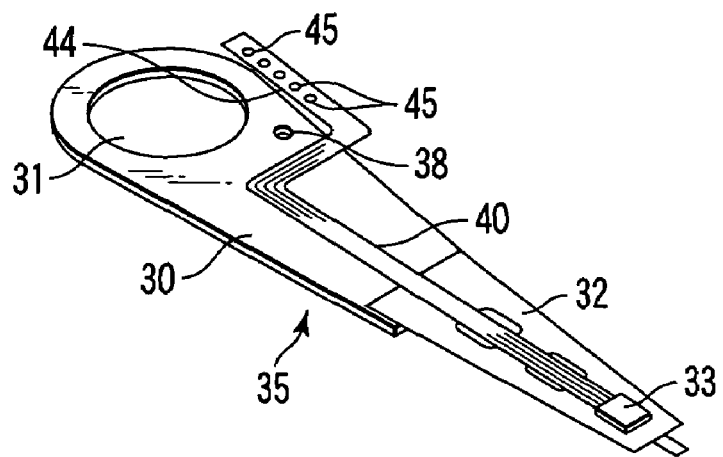
FIG. 11 is a perspective view showing an HGA of the head actuator assembly of the third embodiment.

As shown in FIG. 9, thereafter, at least one of the two arms 30 on the retaining cylinder 41 is rocked around the cylinder 41, whereupon the two arms are positioned and tacked in a manner such that they are staggered by a margin larger than the width of each magnetic head in their rocking direction. The two arms 30 may be mounted on the sleeve 27 so as to establish the aforesaid positional relations in advance.

Subsequently, only magnetic head mounting portions of the suspensions 32 are cleaned in the clean room. After the magnetic heads 33 are then bonded onto gimbals portions 39 of the suspensions 32, their electrodes are soldered and connected electrically to the pads (not shown) of the relay FPC's 40. In doing this, the two arms 30 are staggered, and the respective distal end portions of the suspensions 32 that are mounted with the magnetic heads are also staggered. Therefore, the magnetic heads 33 can be easily mounted and connected without any interference between the two suspensions 32.

After the heads 33 are mounted, the two arms 30 are aligned in opposite positions, and the nut 68 is regularly tightened to fix the arms to the bearing unit 25. Thereafter, only the magnetic heads 33 and their surroundings are subjected again to advanced cleaning. When these processes are carried out, the head actuator assembly is completed. The manufactured head actuator assembly is located in a predetermined position in a case 12.

Also in the second embodiment arranged in this manner, the same functions and effects of the first embodiment can be obtained.

The following is a description of an HDD according to a third embodiment of this invention. Like reference numerals are used to designate like portions of the first to third embodiments, and a detailed description of those portions is omitted. According to the third embodiment, as shown in FIGS. 10 to 13, a head actuator assembly is provided with one HGA 35 alone, and its bearing portion is composed of a bearing unit 25 alone without including a sleeve.

A carriage assembly 22 comprises a bearing assembly 26 fixed on the bottom wall of a case 12, an HGA 35 supported on the bearing assembly, and a spacer ring 34. The bearing unit 25, which serves as a bearing portion, has a retaining cylinder 41, a pair of bearings 43, and a spacer ring 47. The bearings 43 are fitted in the retaining cylinder and opposed to each other with a given gap between them. The spacer ring 47 is located between the paired bearings in the retaining cylinder. An outwardly extending annular flange 41a is formed integrally on the upper end of the retaining cylinder 41. A thread portion 41b is formed on the outer periphery of the lower end portion of the retaining cylinder 41.

The HGA 35 comprises an arm 30 attached to the bearing unit 25, a suspension 32 extending from the arm, and a magnetic head 33 that is supported on an extended end of the suspension by a gimbals portion 39. The arm 30 is a thin flat plate of a stainless-steel material, such as SUS304, with a thickness of about 200 μm. A circular through hole 31 is formed in one end or proximal end portion of the arm 30. The proximal end portion of the arm 30 is formed having a positioning hole 38 through which a positioning screw 37 is passed.

The suspension 32 is formed of an elongated leaf spring with a thickness of 20 to 100 μm. The proximal end of the suspension 32 is fixed to the distal end of the arm 30 by spot welding or adhesive bonding and extends from the arm. The suspension 32 and the arm 30 may be molded integrally from the same material.

The magnetic head 33 is connected electrically to a main FPC 42 (mentioned later) through a relay FPC 40 that has signal wires. The relay FPC 40 is stuck on the respective inner surfaces of the arm 30 and the suspension 32 and extends from the distal end of the suspension to the proximal end portion of the arm. The relay FPC 40 is in the form of an elongated belt as a whole, and its distal end is connected electrically to the electrodes of the magnetic head 33 by bonding or soldering. The other end portion of the relay FPC 40 is cranked and extends outward from the proximal end portion of the arm 30. The other end portion of the relay FPC 40 constitutes a junction 44. The junction 44 is formed having a plurality of connector pads 45, which are spaced in its longitudinal direction. The junction 44 extends parallel to the inner surface of the arm 30. The pads 45 are provided on that surface of the junction 44 which is opposite from the arm 30.

The spacer ring 34 has a through hole 46 through which the bearing unit 25 is passed, a projection 48 that projects sideways, and a support frame 50 that extends in a direction opposite from the arm 30. The ring 34 is molded integrally from a synthetic resin or the like. A voice coil 51 that constitutes a part of a VCM 24 is embedded in the support frame 50. The spacer ring 34 has a tapped hole 51b that is formed in a position corresponding to the positioning hole 38 of the arm 30.

An FPC unit 21 has a base portion 52 and the main FPC 42. The base portion 52 is formed by bending a flexible printed circuit board into a substantially rectangular shape. The main FPC 42 is an elongated belt that extends from the base portion. These elements are formed integrally of a common flexible printed circuit board. The base portion 52 is mounted with a plurality of electronic components, such as a head amplifier, connector, etc., which control information processing of the magnetic head. The base portion 52 is fixed on the bottom wall of the case 12.

An extended end portion of the main FPC 42 that extends from the base portion 52 constitutes a connecting end portion 54. The connecting end portion 54 is provided integrally with a rectangular junction 55 that projects upward. A plurality of connector pads 56 are provided on the surface of the junction 55 and arranged at spaces in the longitudinal direction of the junction. These connector pads 56 correspond to the connector pads 45 of the relay FPC 40 in number and location. The connector pads 56 are connected electrically to the base portion 52 through a conductor pattern of the main FPC 42. A metallic reinforcing plate 58 is fixed to the reverse side of the connecting end portion 54 including the junction 55. The reinforcing plate 58 is bent substantially at right angles along a boundary of the junction 55. The connecting end portion 54 and the reinforcing plate 58 are formed having a through hole 65 through which a fixing screw is passed.

Figure 12:
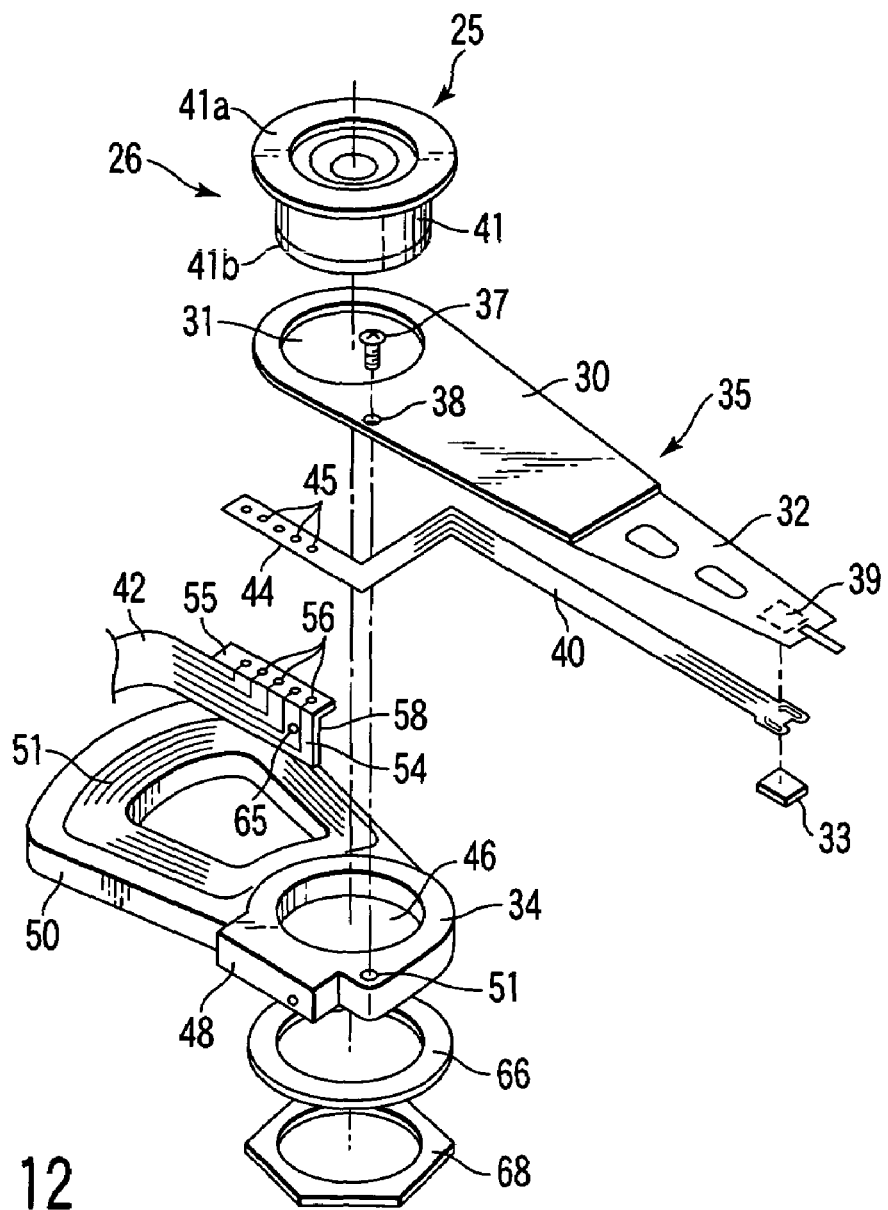
FIG. 12 is an exploded perspective view showing the head actuator assembly of the third embodiment.
Figure 13:
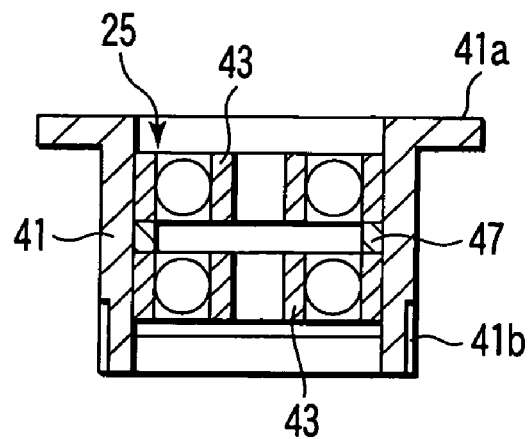
FIG. 13 is a sectional view showing a bearing assembly of the head actuator assembly of the third embodiment.

The arm 30 and the spacer ring 34 constructed in this manner are mounted in layers on the retaining cylinder 41 of the bearing unit 25. As shown in FIG. 12, the suspension 32 and the arm 30 on which the relay FPC 40 is mounted are fitted on the retaining cylinder 41 with the retaining cylinder passed through the through hole 31, and laminated on the flange 41a in the axial direction of the retaining cylinder 41. The spacer ring 34 is fitted on the bearing unit 25 in a manner such that it is laminated on the arm 30 with the retaining cylinder 41 passed through the through hole 46.

The arm 30 and the spacer ring 34 are sandwiched between the flange 41a and a combination of a washer 66 and a nut 68 and are fixedly held on the retaining cylinder 41. The washer 66 is fitted on the lower end portion of the cylinder 41, while the nut 68 is screwed on the thread portion 41b. Further, the positioning screw 37 is passed from above through the positioning hole 38 in the arm 30 and screwed into the tapped hole 51b in the spacer ring 34. Thus, the arm 30 and the spacer ring 34 are located in given relative positions with respect to the circumferential direction of the sleeve 27. A jig may be used to settle positions in the transverse and circumferential directions without using the positioning screw.

The arm 30 extends outward from the retaining cylinder 41 in the circumferential direction and is rockable together with the retaining cylinder. The connecting end portion 54 of the main FPC 42 is fixed to the projection 48 of the spacer ring 34 with screws. The junction 44 of the relay FPC 40 is overlapped on the junction 55 of the main FPC 42. The connector pads 45 of the junction 44 are soldered and connected mechanically and electrically to the connector pads 56 of the junction 55. Thus, the magnetic head 33 is connected electrically to the FPC unit 21 through the relay FPC 40 and the main FPC 42, whereupon the head actuator assembly is completed.

The carriage assembly 22 is located in a predetermined position in the case 12 with the bearing unit 25 fitted on a pivot that is set up on the bottom wall of the case. The base portion 52 of the FPC unit 21 is fixed on the bottom wall of the case 12 with screws.

The voice coil 51 that is fixed to the support frame 50 is situated between a pair of yokes that are fixed on the case 12. The voice coil 51, along with these yokes and a magnet (not shown) fixed to one of the yokes, constitute the VCM 24. If the voice coil 51 is energized to actuate the HDD, the carriage assembly 22 rocks, whereupon the magnetic head 33 is moved and positioned on a desired track of the magnetic disk 16.

In manufacturing the head actuator assembly of this construction, the suspension 32 is first fixed to the arm 30, as shown in FIG. 12, and the relay FPC 40 is then stuck on the arm and the suspension. The spacer ring 34, which is fitted with the voice coil 51, and the FPC unit 21 are prepared in advance. The arm 30, suspension 32, support frame 50, voice coil 51, and FPC unit 21 are subjected to ultrasonic cleaning using, for example, water as a medium. The foregoing manufacturing processes are performed in the atmosphere.

After the cleaning, the above components and the FPC unit 21 are carried into a clean room. In the clean room, the connecting end portion 54 of the main FPC 42 is screwed to the projection 48 of the spacer ring 34, and the connector pads 45 of the relay FPC 40 are soldered individually to their corresponding connector pads 56 on the connecting end portion 54. Thus, the relay FPC 40 and the FPC unit 21 are connected electrically and mechanically to each other. Thereafter, only a magnetic head mounting portion of the suspension 32 is cleaned in the clean room. After the magnetic head 33 is then bonded onto the gimbals portion 39 of the suspension 32, its electrodes are soldered and connected electrically to the pads (not shown) of the relay FPC 40. After the magnetic head 33 is mounted, only the magnetic head 33 and its surroundings are subjected again to advanced cleaning.

Thereafter, the arm 30 and the spacer ring 34 are attached in succession to the retaining cylinder 41 of the bearing unit 25 in the cleaning room. Then, the nut 68 is tightened with the aid of the washer 66 to fix the arm and the spacer ring 34 to the bearing unit 25. When these processes are carried out, the head actuator assembly is completed. The manufactured head actuator assembly is located in a predetermined position in the case 12.

Also in the third embodiment arranged in this manner, the magnetic head 33 is mounted on the suspension and connected electrically to the relay FPC 40 after the relay FPC 40 and the FPC unit 21 are connected electrically to each other. Accordingly, the connecting operation that involves a high possibility of applying static electricity to a signal terminal area of the magnetic head can be restricted to one cycle for magnetic head mounting. Thus, the magnetic head can be securely prevented from being damaged by static electricity, and the yield of manufacture can be improved. Since no magnetic head is present during all other assembly operations than the magnetic head mounting, consideration for static electricity can be greatly lessened, and the manufacturing efficiency can be improved.

Figure 14:
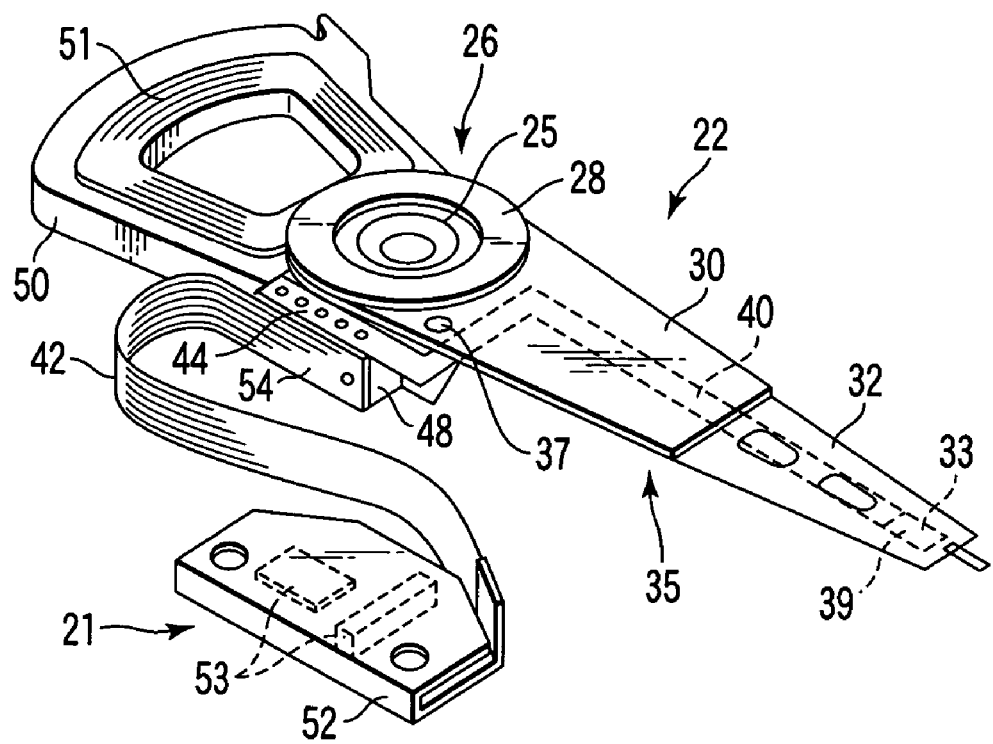
FIG. 14 is a perspective view showing a head actuator assembly according to a fourth embodiment of the invention.
Figure 15:
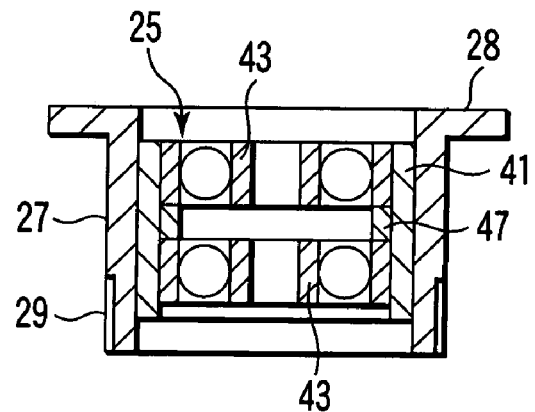
FIG. 15 is a sectional view showing a bearing assembly of the head actuator assembly of the fourth embodiment.
Figure 16:
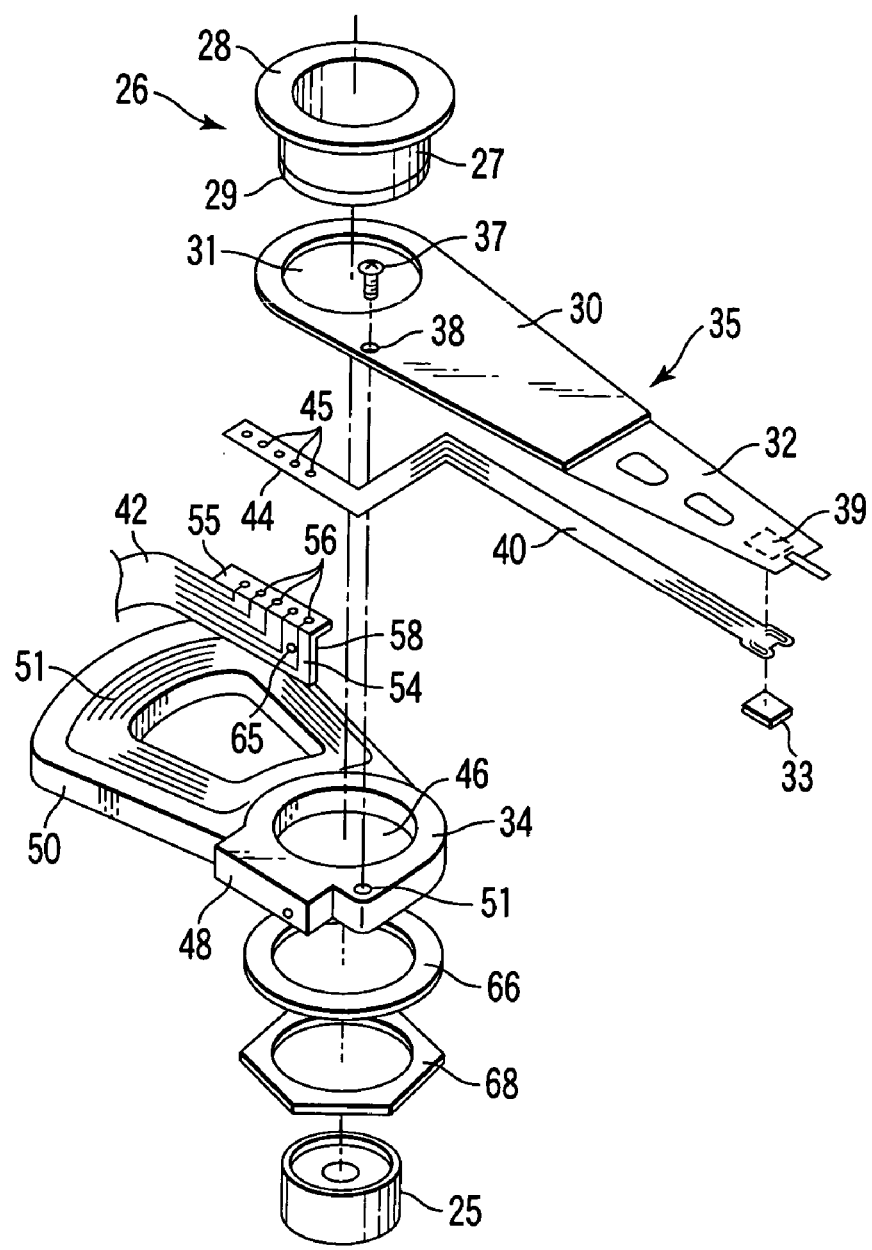
FIG. 16 is an exploded perspective view showing the head actuator assembly of the fourth embodiment.

The following is a description of an HDD according to a fourth embodiment of this invention. Like reference numerals are used to designate like portions of the first to fourth embodiments, and a detailed description of those portions is omitted. According to the fourth embodiment, as shown in FIGS. 14 to 16, a head actuator assembly is provided with one HGA 35 alone, and its bearing portion is composed of a sleeve 27 and a bearing unit 25.

A carriage assembly 22 comprises a bearing assembly 26 fixed on the bottom wall of a case of the HDD, an HGA 35 supported on the bearing assembly, and a spacer ring 34. The bearing assembly 26, which serves as a bearing portion, is provided with the cylindrical sleeve 27 and the bearing unit 25 fitted coaxially in the sleeve. The bearing unit 25 is mounted on a pivot 23 that is set up on the bottom wall of the case. Thus, the sleeve 27 is rotatably supported on the pivot 23 by the bearing unit 25.

An annular flange 28 is formed on the upper end of the sleeve 27, and a thread portion 29 is formed on the outer periphery of the lower end portion of the sleeve. The bearing unit 25 has a retaining cylinder 41, a pair of bearings 43, and a spacer ring 47. The bearings 43 are fitted in the retaining cylinder and opposed to each other with a given gap between them. The spacer ring 47 is located between the paired bearings in the retaining cylinder.

The HGA 35 comprises an arm 30 attached to the sleeve 27, a suspension 32 extending from the arm, and a magnetic head 33 that is supported on an extended end of the suspension by a gimbals portion 39. The proximal end portion of the arm 30 is formed having a circular through hole 31 and a positioning hole 38 through which a positioning screw 37 is passed.

The arm 30 and the spacer ring 34 are mounted in layers on the sleeve 27 of the bearing assembly 26. The suspension 32 and the arm 30, on which a relay FPC 40 is mounted, are fitted on the sleeve 27 in a manner such that it is laminated on the flange 28 in the axial direction of the sleeve 27 with the sleeve passed through the through hole 31. The spacer ring 34 is fitted on the sleeve 27 in a manner such that it is laminated on the arm 30 with the sleeve 27 passed through a through hole 46.

The arm 30 fitted on the sleeve 27 and the spacer ring 34 are sandwiched between the flange 28 and a combination of a washer 66 and a nut 68 and are fixedly held on the sleeve 27. The washer 66 is fitted on the lower end portion of the sleeve 27, while the nut 68 is screwed on the thread portion 29 of the sleeve. Further, the positioning screw 37 is passed from above through the positioning hole 38 in the arm 30 and screwed into a tapped hole 51b in the spacer ring 34. Thus, the arm 30 and the spacer ring 34 are located in given relative positions with respect to the circumferential direction of the sleeve 27.

The arm 30 extends outward from the sleeve 27 in the circumferential direction and is rockable together with the sleeve. A connecting end portion 54 of a main FPC 42 is fixed to a projection 48 of the spacer ring 34 with screws. A junction 44 of the relay FPC 40 is overlapped on a junction 55 of the main FPC 42. Connector pads 45 of the junction 44 are soldered and connected mechanically and electrically to connector pads 56 of the junction 55. Thus, the magnetic head 33 is connected electrically to an FPC unit 21 through the relay FPC 40 and the main FPC 42, whereupon the head actuator assembly is completed.

The head actuator assembly of this construction is manufactured in the following processes. First, the suspension 32 is fixed to the arm 30, as shown in FIG. 16, and the relay FPC 40 is then stuck on the arm and the suspension. Further, the spacer ring 34, which is fitted with a voice coil 51, and the FPC unit 21 are prepared in advance.

Subsequently, the arm 30 and the spacer ring 34 are attached in succession to the sleeve 27 of the bearing assembly 26, and the nut 68 is temporarily tightened with the aid of the washer 66 to form a stack assembly. Thereafter, the connecting end portion 54 of the main FPC 42 is screwed to the projection 48 of the spacer ring 34, and the connector pads 45 of the relay FPC 40 are soldered individually to their corresponding connector pads 56 on the connecting end portion 54. Thus, the relay FPC 40 and the FPC unit 21 are connected electrically and mechanically to each other.

Then, the carriage assembly 22 and the FPC unit 21, which are temporarily assembled, are cleaned temporarily. The foregoing manufacturing processes are performed in the atmosphere, for example. The temporary cleaning may be omitted.

After the temporary cleaning, the carriage assembly 22 and the FPC unit 21 are carried into a clean room, and these elements, including the sleeve 27, are subjected to advanced cleaning in the clean room. After the magnetic head 33 is then bonded onto the gimbals portion 39 of the suspension 32, its electrodes are soldered and connected electrically to the pads (not shown) of the relay FPC 40.

After the magnetic head 33 is mounted in this manner, the carriage assembly 22 and the FPC unit 21 are subjected again to advanced cleaning to be cleared of dust. Ultrasonic cleaning using, for example, water as a medium is employed as the advanced cleaning. Then, the bearing unit 25 is forced into the sleeve 27 to form the bearing assembly 26 in the clean room. When these processes are carried out, the head actuator assembly is completed. The manufactured head actuator assembly is located in a predetermined position in the case 12.

Also in the fourth embodiment arranged in this manner, the same functions and effects of the foregoing embodiments can be obtained.

This invention is not limited directly to the embodiments described above, and its components may be embodied in modified forms without departing from the scope or spirit of the invention. Further, various inventions may be made by suitably combining a plurality of components described in connection with the foregoing embodiments. For example, some of the components according to the foregoing embodiments may be omitted. Furthermore, components according to different embodiments may be combined as required.

In the foregoing embodiments, the bearings and the magnetic heads are mounted in the clean room after all the other component members than them are assembled in the atmosphere. Alternatively, however, other assembly operations, such as connection between the relay and main FPC's, may be performed in the clean room. The cleaning method is not limited to ultrasonic cleaning, and any other cleaning methods may be used instead.

Further, the manufacturing methods for the head actuator assembly and the disk device according to this invention may be also applied to a head actuator assembly of an HDD that is provided with two or more magnetic disks and a head actuator assembly that has three or more HGA's. Furthermore, this invention may be also applied to head actuator assemblies of any disk devices, such as optical disk devices, other than magnetic disk devices.

What is claimed is:

1. A method of manufacturing a head actuator assembly, which has a head which processes information for a disk-shaped recording medium, a suspension which supports the head, a bearing portion which has a sleeve and a bearing unit fitted in the sleeve, an arm which supports the suspension and is rotatably supported by the bearing portion, signal wires which extend on the suspension and the arm and are connected electrically to the head, a board unit having a connecting end portion connected to the signal wires, and a control section which controls the information processing of the head, the method comprising:

mounting the signal wires on the suspension and the arm;
assembling the suspension, arm, and the sleeve with no bearing unit to form an assembly;
connecting the connecting end portion of the board unit to the signal wires mounted on the suspension and the arm;
cleaning the assembly and the connected board unit; and
after cleaning, fitting the bearing unit in the sleeve, mounting the head on the suspension and connecting the head electrically to the signal wires which are connected to the connecting end portion of the board unit.

2. The method of manufacturing a head actuator assembly according to claim 1, wherein after performing the assembling of the assembly and the connecting the connecting end portion of the board in a first environment, the fitting of the bearing unit into the sleeve and the mounting of the head on the suspension are performed in a second environment which has a degree of cleanness higher than that of the first environment.

* * * * *